United States Patent
Leu

(10) Patent No.: US 10,063,755 B2
(45) Date of Patent: Aug. 28, 2018

(54) AUTOFOCUS METHOD OF CAMERA USING TEMPERATURE AND GRAVITY SENSORS, APPARATUS FOR CONTROLLING CAMERA, AND SYSTEM INCLUDING THE SAME

(71) Applicant: SAMSUNG ELECTRONICS CO., LTD., Suwon-si, Gyeonggi-do (KR)

(72) Inventor: Ho June Leu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 95 days.

(21) Appl. No.: 15/230,665

(22) Filed: Aug. 8, 2016

(65) Prior Publication Data
US 2017/0054884 A1 Feb. 23, 2017

(30) Foreign Application Priority Data
Aug. 20, 2015 (KR) .................. 10-2015-0117475

(51) Int. Cl.
*H04N 5/225* (2006.01)
*G02B 7/36* (2006.01)

(52) U.S. Cl.
CPC .............. *H04N 5/2254* (2013.01); *G02B 7/36* (2013.01)

(58) Field of Classification Search
CPC ................................ H04N 5/2254; G02B 7/36
See application file for complete search history.

(56) References Cited

U.S. PATENT DOCUMENTS

| | | | |
|---|---|---|---|
| 7,663,824 B2 | 2/2010 | Lee | |
| 7,693,411 B2 | 4/2010 | Kwon et al. | |
| 7,835,636 B2 | 11/2010 | Yuyama | |
| 7,925,148 B2 | 4/2011 | Choi et al. | |
| 8,373,793 B2 | 2/2013 | Kim | |
| 8,994,875 B2 | 3/2015 | Kim | |
| 2006/0209195 A1* | 9/2006 | Goto | G02B 7/102 348/219.1 |
| 2012/0257065 A1* | 10/2012 | Velarde | H04N 5/2258 348/175 |
| 2014/0268361 A1 | 9/2014 | Nunnink et al. | |

FOREIGN PATENT DOCUMENTS

| | | |
|---|---|---|
| KR | 100211775 B1 | 5/1999 |
| KR | 1020100056150 A | 5/2010 |
| KR | 1020110080589 A | 7/2011 |
| KR | 1020120045387 A | 5/2012 |
| KR | 1020120067049 A | 6/2012 |

\* cited by examiner

*Primary Examiner* — Christopher K Peterson
(74) *Attorney, Agent, or Firm* — Volentine, Whitt & Francos, PLLC

(57) ABSTRACT

A camera controller controls a camera module, which includes a plastic lens and an actuator controlling a position of the lens in an open-loop mode. The camera controller includes an offset determiner configured to determine a first offset corresponding to a measured temperature of a camera and a second offset corresponding to a measured posture of the camera, a lens moving range determiner configured to determine a moving range of the lens based on the first offset and the second offset, and an autofocus calculator configured to output a position control signal for controlling a position of the lens and seek a focus position of the lens based on the lens moving range.

20 Claims, 10 Drawing Sheets

| CPOS(X,Y,Z angle) | PT_OFF |
|---|---|
| (0,90,0) | 0 |
| (0,0,90) | -70 |
| ⋮ | ⋮ |

| CTEMP(°C) | TT_OFF |
|---|---|
| -20 | -60 |
| -10 | -45 |
| ⋮ | ⋮ |

AUTOFOCUS METHOD OF CAMERA USING TEMPERATURE AND GRAVITY SENSORS, APPARATUS FOR CONTROLLING CAMERA, AND SYSTEM INCLUDING THE SAME

CROSS-REFERENCE TO RELATED APPLICATIONS

This application claims priority under 35 U.S.C. § 119(a) from Korean Patent Application No. 10-2015-0117475 filed on Aug. 20, 2015, the disclosure of which is hereby incorporated by reference in its entirety.

BACKGROUND

Embodiments of the disclosure relate to an autofocus apparatus and method for a camera, and more particularly, to a camera controller using a gravity sensor and a temperature sensor, an autofocus method for a camera, and a system including the camera controller.

Autofocus is a function of automatically focusing on an object and provides faster and more accurate focusing than manual focus. A camera module supporting the autofocus usually includes an image sensor, a lens, and an actuator moving the lens. The actuator moves the lens in a direction perpendicular to the plane of a sensor so that the lens is in focus. Actuator types include a voice coil motor (VCM), a Piezo motor, and a stepper motor. A VCM actuator is usually used in low-middle priced mobile cameras.

Camera lenses are divided into glass lenses, plastic lenses, and liquid lenses according to materials. Low priced plastic lenses are usually used in mobile cameras. A plastic lens has a disadvantage of low heat resistance. In other words, the plastic lens greatly contracts and expands according to ambient temperature, thereby significantly changing a focal length.

SUMMARY

According to some embodiments of the disclosure, there is provided an autofocus method of a camera which includes a plastic lens and an actuator controlling a position of the lens in an open-loop mode. The autofocus method includes receiving measured temperature information obtained by measuring an ambient temperature of the camera, receiving measured posture information obtained by measuring a posture of the camera, determining a first offset based on the measured temperature information, determining a second offset based on the measured posture information, determining a lens moving range based on the first offset and the second offset, and seeking a focus position of the lens based on the lens moving range.

The determining the lens moving range may include setting an initial lens moving range in a register and determining the lens moving range by adding the first offset and the second offset to the initial lens moving range.

The initial lens moving range may include an initial start value and an initial end value. The determining the lens moving range may include determining a start position of the lens by adding the first offset and the second offset to the initial start value and determining an end position of the lens by adding the first offset and the second offset to the initial end value.

The seeking the focus position of the lens may include outputting a position control signal based on the start position, receiving and analyzing an image which has been captured using the lens driven to the start position, and determining whether the lens is in focus based on the analysis result.

The seeking the focus position of the lens may further include outputting a position change signal when it is determined that the lens is not in focus and receiving and analyzing an image which has been captured using the lens driven to a position changed according to the position change signal.

The determining the first offset may include selecting at least one temperature offset approximating to the measured temperature information from a first lookup table which includes temperature offsets respectively corresponding to a plurality of temperatures.

The determining the first offset may further include calculating the first offset by performing interpolation on at least two temperature offsets that have been selected.

The determining the second offset may include selecting at least one posture offset approximating to the measured posture information from a second lookup table which includes posture offsets respectively corresponding to a plurality of postures.

The determining the second offset may further include calculating the second offset by performing interpolation on at least two posture offsets that have been selected.

According to other embodiments of the disclosure, there is provided a camera controller for controlling a camera module which includes a plastic lens and an actuator controlling a position of the lens in an open-loop mode. The camera controller includes an offset determiner configured to determine a first offset corresponding to a measured temperature of a camera and a second offset corresponding to a measured posture of the camera, a lens moving range determiner configured to determine a moving range of the lens based on the first offset and the second offset, an autofocus calculator configured to seek a focus position of the lens based on the lens moving range, and a control signal generator configured to generate a control signal for controlling the actuator based on the lens moving range.

The camera controller may further include a register configured to store an initial lens moving range.

The initial lens moving range may include an initial start value and an initial end value. The lens moving range determiner may determine a start position of the lens by adding the first offset and the second offset to the initial start value and may determine an end position of the lens by adding the first offset and the second offset to the initial end value.

The offset determiner may include a first lookup table configured to store temperature offsets respectively corresponding to a plurality of temperatures and to select and output at least one temperature offset approximating to the measured temperature; and a second lookup table configured to store posture offsets respectively corresponding to a plurality of postures and to select and output at least one posture offset approximating to the measured posture.

The temperature offsets and the posture offsets may be predetermined by testing or simulating the camera module or a representative of the camera module.

According to further embodiments of the disclosure, there is provided a camera system including a camera module including a plastic lens and an actuator controlling a position of the lens in an open-loop mode, a temperature sensor configured to measure a temperature of the camera module, a posture sensor configured to measure a posture of the camera module, and a camera controller configured to control the camera module based on the measured temperature and the measured posture. The camera controller may determine a first offset corresponding to the measured temperature and a second offset corresponding to the measured posture, determine a moving range of the lens based on the first offset and the second offset, and seek a focus position of the lens based on the lens moving range.

The camera controller may determine the lens moving range by adding the first offset and the second offset to a predetermined initial lens moving range and may output a position control signal, for controlling the actuator, to the camera module based on the lens moving range.

The camera module may adjust the position of the lens based on the position control signal, capture an image using the adjusted lens, and output the image to the camera controller. The camera controller may receive and analyze the image from the camera module and may determine whether the lens is in focus based on the analysis result.

The camera controller may calculate a contrast value of the image and may determine whether the lens is in focus based on a peak value of the contrast value.

The camera controller may not receive information about the position of the lens from the camera module, may output the position control signal to the camera module to sequentially change the position of the lens within the lens moving range until the lens is in focus, and may receive and analyze an image captured using the lens whose position is changed in response to the position control signal from the camera module.

According to further embodiments of the disclosure, there is provided a camera system having a camera module that includes a lens and an actuator that moves the lens along an axis within the camera module. A sensor measures temperature or a posture of the camera module. An electronic circuit generates an actuator command for moving the lens along the axis, increases or decreases an amplitude of the actuator command in accordance with an offset amplitude corresponding to the measured temperature or posture, so as to generate a modified actuator command, and communicates the modified actuator command to the actuator so as to move the lens along the axis.

The sensor may measure the temperature and another sensor may measure the posture, the offset amplitude may correspond to the measured temperature, and the electronic circuit may increase or decrease the amplitude of the actuator command in accordance with both the offset amplitude and another offset amplitude corresponding to the measured posture, so as to generate the modified actuator command.

The posture may identify an orientation of the camera module with respect the direction of gravitational force.

The modified actuator command may be an electrical current.

The electronic circuit may interpolate the offset amplitude from a first offset amplitude corresponding to a first temperature that is lower than the measured temperature and a second offset amplitude corresponding to a second temperature that is higher than the measured temperature.

The electronic circuit may interpolate the offset amplitude from a first offset amplitude corresponding to a first value that is lower than the measured posture and a second offset amplitude corresponding to a second value that is higher than the measured posture.

The electronic circuit may autofocus on an object viewed through the lens by applying an open-loop control methodology to an electrical current applied to the actuator.

BRIEF DESCRIPTION OF THE DRAWINGS

The above and other features and advantages of the disclosure will become more apparent by describing in detail exemplary embodiments thereof with reference to the attached drawings in which:

FIGS. 5A and 5B are diagrams of a posture lookup table (LUT) and a temperature LUT, which are illustrated in FIG. 4, according to some embodiments of the disclosure;

DETAILED DESCRIPTION OF THE EMBODIMENTS

Figure 1:
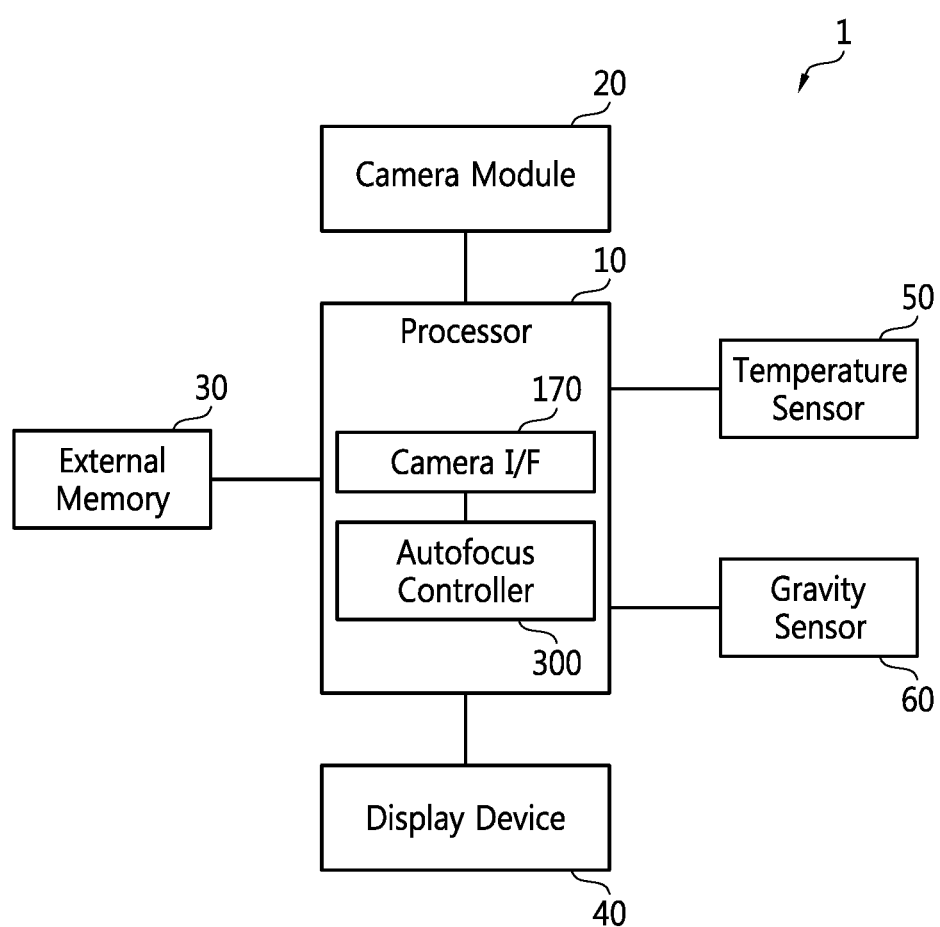
FIG. 1 is a block diagram of a camera system according to some embodiments of the disclosure.

The disclosure now will be described more fully hereinafter with reference to the accompanying drawings, in which embodiments of the disclosure are shown. This disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
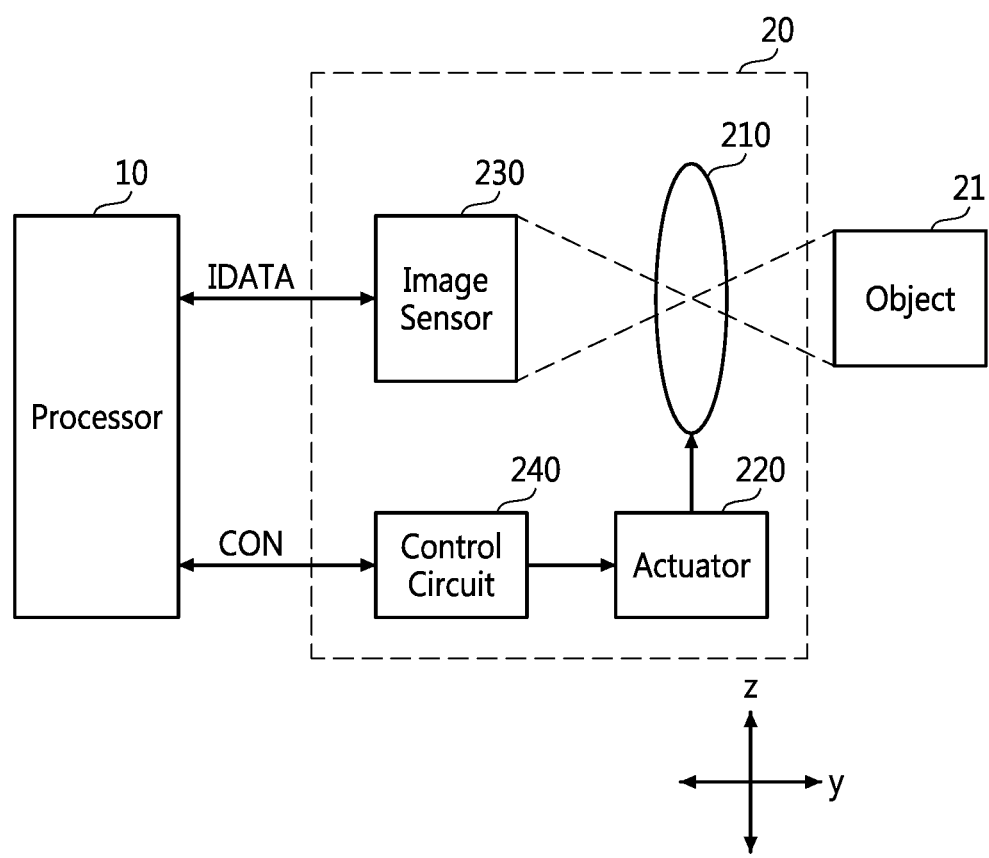
FIG. 2 is a block diagram of a camera module illustrated in FIG. 1 according to some embodiments of the disclosure.
Figure 3:
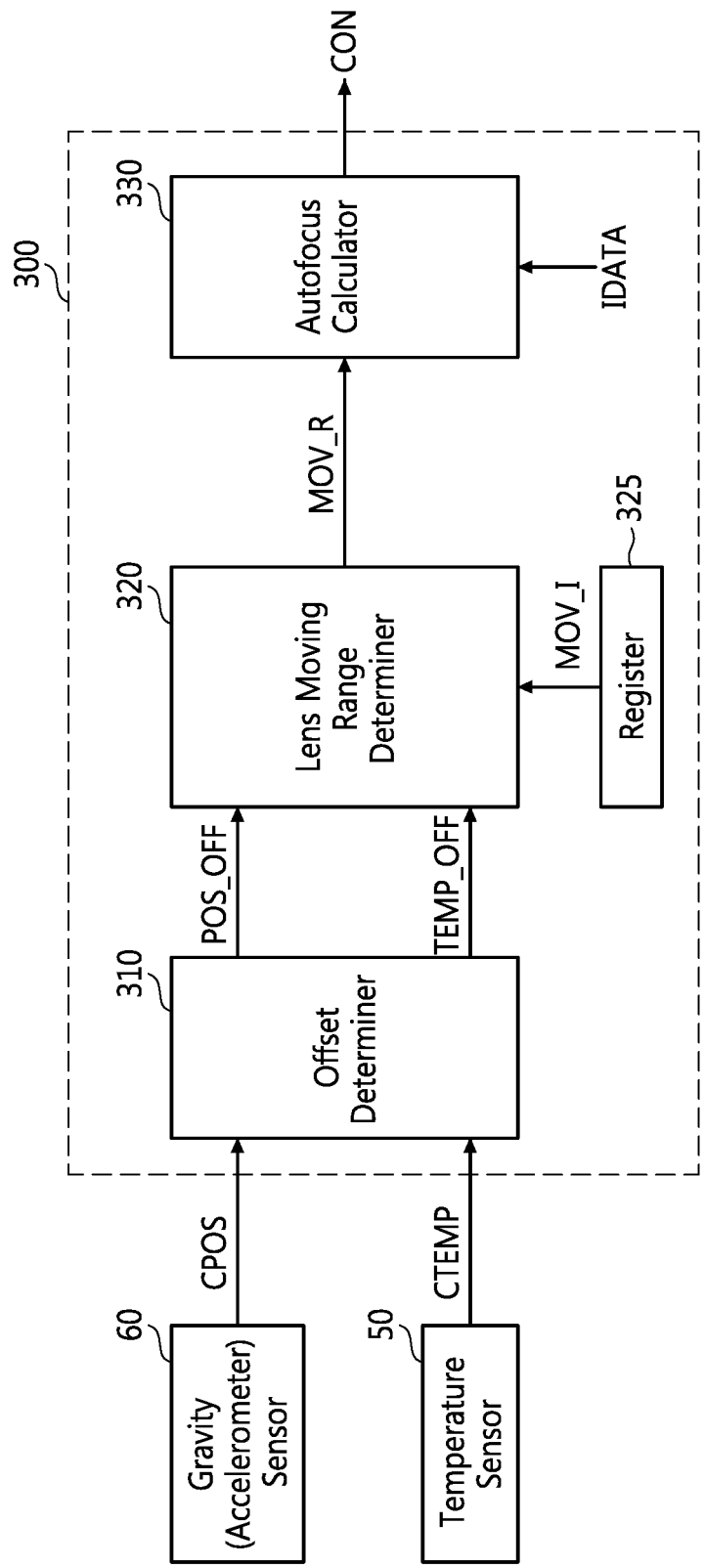
FIG. 3 is a block diagram of an autofocus controller illustrated in FIG. 1 according to some embodiments of the disclosure.
Figure 4:
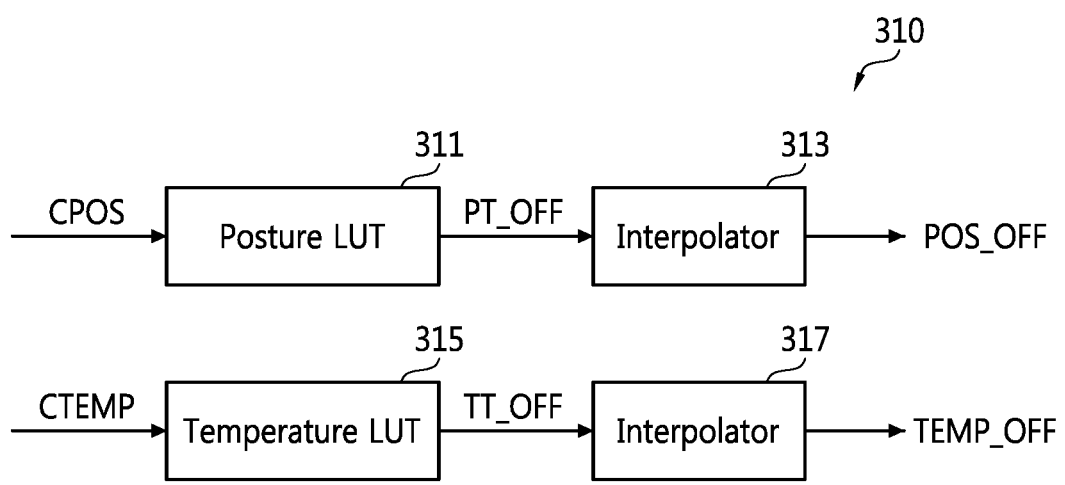
FIG. 4 is a block diagram of an offset determiner illustrated in FIG. 3 according to some embodiments of the disclosure.
Figure 6:
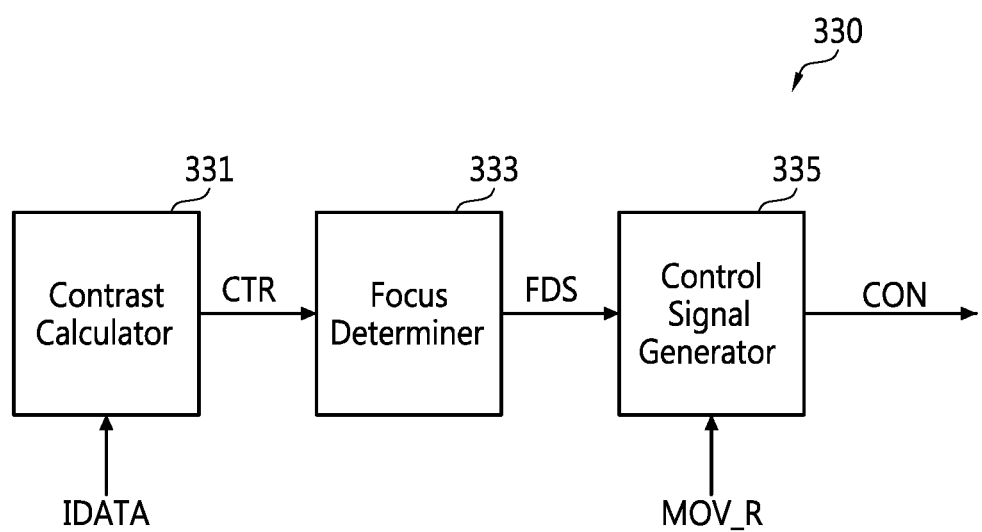
FIG. 6 is a block diagram of an autofocus calculator illustrated in FIG. 3 according to some embodiments of the disclosure.

FIG. 1 is a block diagram of a camera system 1 according to some embodiments of the disclosure. FIG. 2 is a block diagram of a camera module 20 illustrated in FIG. 1 according to some embodiments of the disclosure. FIG. 3 is a block diagram of an autofocus controller 300 illustrated in FIG. 1 according to some embodiments of the disclosure. FIG. 4 is a block diagram of an offset determiner 310 illustrated in FIG. 3 according to some embodiments of the disclosure. FIGS. 5A and 5B are diagrams of a posture lookup table (LUT) 311 and a temperature LUT 315, which are illustrated in FIG. 4, according to some embodiments of the disclosure. FIG. 6 is a block diagram of an autofocus calculator 330 illustrated in FIG. 3 according to some embodiments of the disclosure.

Referring to FIGS. 1 through 6, the camera system 1 may include a processor 10, the camera module 20, an external memory 30, a display device 40, a temperature sensor 50, and a gravity sensor 60. The camera module 20 may include a lens 210, an actuator 220, an image sensor 230, and a control circuit 240.

The lens 210 may be a lens (hereinafter, referred to as a "focusing lens") for taking focus. The camera module 20 may also include a lens (not shown) for gathering light and a lens (not show) for scattering light. In other words, the camera module 20 may include at least two lenses which perform different functions from each other. The focusing lens 210 may be made of plastic. When the focusing lens 210 is made of plastic, the camera system 1 may form a low-middle priced camera.

The actuator 220 adjusts the position of the focusing lens 210 to perform autofocus. The actuator 220 may be a voice coil motor (VCM) actuator which controls the position of the focusing lens 210 in an open-loop mode. The open-loop mode is different from a closed-loop mode, in which the position of the lens 210 is controlled using feedback information on the position of the lens 210, in that the position of the lens 210 is adjusted without using the feedback. Accordingly, the camera module 20 does not include a sensor for measuring or sensing the position of the lens 210.

The VCM actuator 220 levitates the lens 210 using an electromagnetic field induced in a coil when current is supplied to a VCM. Therefore, the VCM actuator 220 adjusts the position of the lens 210 by adjusting the amount (or amplitude) of current supplied to the VCM. Since the VCM actuator 220 does not have the feedback of the position of the lens 210, the position of the lens 210 driven by the VCM actuator 220 may be different depending on the posture of the lens 210, for example, whether the lens 210 faces the surface of the earth or an opposite, even when the same current is supplied to the VCM.

The actuator 220 may move the focusing lens 210 back and forth (e.g., along the y-axis), up and down (e.g., along the z-axis), and from side to side (e.g., along the x-axis) so that the lens 210 is in focus. In FIG. 2, the x-axis may be perpendicular to the y-z plane. For clarity of the description, it is assumed that the z-axis is perpendicular to the surface of the earth and the x-axis and the z-axis are perpendicular to the y-axis.

The control circuit 240 controls the actuator 220 according to a position control signal of the processor 10. The control circuit 240 may generate an actuator command for moving the lens 210 along the axis, and communicate the actuator command to the actuator 220 so as to move the lens 210 along the axis. The actuator command may be an electrical current. The control circuit 240 may supply a current corresponding to the position control signal of the processor 10 to the actuator 220.

The image sensor 230 may operate according to the control of the processor 10 to generate image information. The image sensor 230 senses an object 21 picked up through the lens 210 and transmits an image to the processor 10 according to the control of the processor 10.

The processor 10 may process the image sensed by the image sensor 230 and may store the processed image in the external memory 30 or output the processed image to the display device 40. At this time, the display device 40 may be any device that can output an image. The display device 40 may be implemented as a liquid crystal display (LCD) device, a light emitting diode (LED) display device, an organic LED (OLED) display device, or an active matrix OLED (AMOLED) display device. The display device 40 may receive an image (e.g., a still image or a moving image) from the processor 10 or the external memory 30 and display the image through a display (e.g., LCD or AMOLED display).

The temperature sensor 50 measures temperature of the camera system 1. The temperature sensor 50 may measure an internal or ambient temperature of the camera system 1 according to its position. The temperature sensor 50 may measure the temperature periodically or at the request of the processor 10 and may transmit measured temperature information CTEMP to the processor 10.

The gravity sensor 60 measures a posture of the camera. The gravity sensor 60 may be implemented as an accelerometer sensor, but the disclosure is not restricted to this example. The gravity sensor 60 may sense gravity to detect an angle of the lens 210 to the at least one reference axis, i.e., the x-, y- or z-axis. The gravity sensor 60 may express a direction which the lens 210 faces as x-, y- and z-axes angle information. The x-, y- and z-axes angle information may have a range of −90 to +90 degrees, but the disclosure is not restricted to this example.

For instance, it may be defined that the z-axis angle is −90 degrees when the lens 210 faces the surface of the earth, the z-axis angle is +90 degrees when the lens 210 faces a direction (e.g., sky or ceiling) opposite to the surface of the earth, the y-axis angle is +90 degrees when the lens 210 faces the front, the y-axis angle is −90 degrees when the lens 210 faces the back, the x-axis angle is +90 degrees when the lens 210 faces the right side, and the x-axis angle is −90 degrees when the lens 210 faces the left side.

The gravity sensor 60 may measure the posture of the camera module 20 periodically or at the request of the processor 10 and may transmit measured posture information CPOS to the processor 10. The posture of the camera may identify an orientation of the camera module 20 with respect the direction of gravitational force.

The temperature sensor 50 and the gravity sensor 60 are placed outside the camera module 20 in the embodiments illustrated in FIG. 1, but they may be placed within the camera module 20 in other embodiments.

The processor 10 may be a camera controller. The processor 10 may control the operations of the camera module 20, the external memory 30, the display device 40, the temperature sensor 50, and the gravity sensor 60; may communicate control signals and data with these elements 20, 30, 40, 50, and 60; and may process the data. In the embodiments illustrated in FIG. 1, the cameral controller is implemented as the processor 10, but the disclosure is not restricted to the current embodiments. For instance, the cameral control unit may be implemented as a system-on-chip (SoC) including at least one processor or other types of modules.

The processor 10 may include a camera interface (I/F) 170 and the autofocus controller 300. The processor 10 may also include additional elements such as at least one processing unit or core and interface circuits. The autofocus controller 300 may be implemented by at least one processing unit.

The camera I/F 170 interfaces with the camera module 20. The camera I/F 170 may output a control signal for controlling the camera module 20 and may receive image data from the camera module 20 according to a predetermined interface standard or protocol. The camera I/F 170 may store the image data received from the camera module 20 in the external memory 30 or may transmit the image data to the autofocus controller 300.

The autofocus controller 300 determines a moving range of the lens 210, in which the focus position of the lens 210 is sought, and seeks the focus position of the lens 210 in the moving range in an autofocus mode in which autofocus is performed. Referring to FIG. 3, the autofocus controller 300 may include the offset determiner 310, a lens moving range determiner 320, a register 325, and the autofocus calculator 330.

The offset determiner 310 receives the measured temperature information CTEMP from the temperature sensor 50 and the measured posture information CPOS from the gravity sensor 60 and determines first and second offsets TEMP_OFF and POS_OFF based on the measured temperature information CTEMP and the measured posture information CPOS. In order to determine the first offset TEMP_OFF and the second offset POS_OFF, the offset determiner 310 may include the posture LUT 311 and the temperature LUT 315 shown in FIGS. 5A and 5B, respectively.

The posture LUT 311 stores a predetermined posture offset PT_OFF corresponding to each of the postures which the camera module 20 or the lens 210 within the camera module 20 can have. As described above, a posture may be defined as angle information of the camera module 20 or the lens 210 with respect to the at least one reference axis (e.g., the x-, y- and z-axes).

The posture may be expressed as (x, y, z) angle. The posture LUT 311 stores a plurality of (x, y, z) angle-to-posture offset entries. Each entry may include a predetermined (x, y, z) angle and a corresponding posture offset PT_OFF. For instance, the posture LUT 311 may store the posture offset PT_OFF set to "0" for an (x, y, z) angle of (0, 90, 0) and the posture offset PT_OFF set to "−70" for an (x, y, z) angle of (0, 0, 90), as shown in FIG. 5A, but the disclosure is not restricted to the current embodiments.

The posture offset PT_OFF corresponding to each (x, y, z) angle may be calculated by testing or simulating the camera module 20 or a representative of the camera module 20. For instance, it is assumed that the posture offset PT_OFF used to drive the lens 210 at a reference posture (e.g., (x, y, z) angle of (0, 90, 0)) to a reference position is a reference offset (e.g., "0"). Whenever the posture of the camera module 20 is changed on this assumption, an offset needed to drive the lens 210 at the changed posture to the reference position is calculated, so that the entries of the posture LUT 311 can be obtained. The posture LUT 311 may select and output the posture offset PT_OFF corresponding to the measured posture information CPOS or at least one posture offset PT_OFF most approximating to the measured posture information CPOS among the entries that have been stored in advance.

The temperature LUT 315 stores a temperature offset TT_OFF corresponding to each of different temperatures. For instance, the temperature LUT 315 stores a plurality of temperature-to-temperature offset entries. Each entry may include a predetermined temperature and a corresponding temperature offset TT_OFF.

The temperature offset TT_OFF corresponding to a temperature may be calculated by testing or simulating the camera module 20 or a representative of the camera module 20. For instance, it is assumed that the temperature offset TT_OFF used to drive the lens 210 at a reference temperature (e.g., 20° C.) to the reference position is a reference offset (e.g., "0"). Whenever the temperature of the camera module 20 is changed on this assumption, an offset needed to drive the lens 210 at the changed temperature to the reference position is calculated, so that the entries of the temperature LUT 315 can be obtained.

As shown in FIG. 5B, the temperature LUT 315 may store the temperature offset TT_OFF set to "−60" for a temperature of −20° C. and the temperature offset TT_OFF set to "−45" for a temperature of −10° C. The temperature LUT 315 may select and output the temperature offset TT_OFF corresponding to the measured temperature information CTEMP or at least one temperature offset TT_OFF most approximating to the measured temperature information CTEMP among the entries that have been stored in advance.

The offset determiner 310 may also include a posture offset interpolator 313 and a temperature offset interpolator 317. At this time, the posture LUT 311 may select and output two posture offsets PT_OFF approximating to the measured posture information CPOS among the entries stored in advance. The posture offset interpolator 313 may perform interpolation on the two posture offsets PT_OFF to calculate the second offset POS_OFF corresponding to the measured posture information CPOS.

The temperature LUT 315 may select and output two temperature offsets TT_OFF approximating to the measured temperature information CTEMP among the entries stored in advance. The temperature offset interpolator 317 may perform interpolation on the two temperature offsets TT_OFF to calculate the first offset TEMP_OFF corresponding to the measured temperature information CTEMP.

The lens moving range determiner 320 determines a lens moving range MOV_R according to the first and second offsets TEMP_OFF and POS_OFF output from the offset determiner 310. The lens moving range determiner 320 determines the lens moving range MOV_R by adding the first offset TEMP_OFF and the second offset POS_OFF to an initial lens moving range MOV_I. The lens moving range MOV_R may be defined by a start value and an end value.

The initial lens moving range MOV_I may be stored in the register 325, but the disclosure is not restricted to the current embodiments. The initial lens moving range MOV_I may be stored in memory (e.g., the external memory 30 or internal memory (not shown) of the processor 10) in other embodiments.

The initial lens moving range MOV_I may include an initial start value and an initial end value. At this time, the lens moving range determiner 320 may determine the start value of the lens moving range MOV_R by adding the first offset TEMP_OFF and the second offset POS_OFF to the initial start value and determine the end value of the lens moving range MOV_R by adding the first offset TEMP_OFF and the second offset POS_OFF to the initial end value.

The lens moving range MOV_R, the first offset TEMP_OFF, and the second offset POS_OFF each may be expressed as a digital code (referred to as a "current control code") for controlling the driving current of the actuator 220. The position of the lens 210 is controlled according to the amount of driving current of the actuator 220. The start value of the lens moving range MOV_R may be a current control code for designating a lens position at which auto focusing starts and the end value of the lens moving range MOV_R may be a current control code for designating a lens position at which the auto focusing ends.

The autofocus calculator 330 seeks a lens focus position based on the lens moving range MOV_R determined by the lens moving range determiner 320. The autofocus calculator 330 receives an image IDATA captured by the image sensor 230 through the camera I/F 170, analyzes the image IDATA, and determines whether the lens 210 is in focus based on the analysis result. The autofocus calculator 330 controls the camera module 20 to change the position of the lens 210 within the lens moving range MOV_R and analyzes the image IDATA captured using the lens 210 whose position has been changed to seek the position of the lens 210 at which the lens 210 is in focus. Referring to FIG. 6, the autofocus calculator 330 includes a contrast calculator 331, a focus determiner 333, and a control signal generator 335.

The contrast calculator 331 receives the image IDATA captured by the image sensor 230 and calculates a contrast value CTR of the image IDATA. The image IDATA may be image data corresponding to one frame.

The focus determiner 333 determines whether the lens 210 is in focus based on a peak value of the contrast value CTR. The contrast value CTR is obtained by quantifying a relative difference between the brightest part and the darkest part in the image IDATA.

When the contrast value CTR of the image IDATA is calculated while changing the position of the lens 210 within the lens moving range MOV_R, the contrast value CTR may gradually increase and then decrease. At this time, the lens 210 is in focus at a position corresponding to the peak value of the contrast value CTR. Accordingly, the focus determiner 333 may determine the focusing state and the focusing position of the lens 210 based on the peak value of the contrast value CTR and may provide a determination result FDS for the control signal generator 335.

The control signal generator 335 may output a position control signal CON to the camera module 20 based on the determination result FDS of the focus determiner 333 and the lens moving range MOV_R. The control signal generator 335 may output the position control signal CON corresponding to the start value (i.e., the start current control code) of the lens moving range MOV_R to the camera module 20 and then may output the position control signal CON corresponding to a value one step higher than the start value of the lens moving range MOV_R to the camera module 20. As described above, the control signal generator 335 may output the position control signal CON for sequentially changing the position of the lens 210 to the camera module 20 until the control signal generator 335 receives the determination result FDS indicating that the lens 210 is in focus from the focus determiner 333. The position control signal CON may be converted into a signal complying with a predetermined interface standard in the camera I/F 170 before being transmitted to the camera module 20.

The control circuit 240 of the camera module 20 controls the driving current of the actuator 220 in response to the position control signal CON. Accordingly, the actuator 220 drives the lens 210 to a position corresponding to the position control signal CON.

In the current embodiments of the disclosure, a sensor for measuring or sensing the position of the lens 210 is not provided and the position of the lens 210 is controlled using the amount of driving current of the actuator 220 in the open-loop mode. Accordingly, even at the same amount of driving current of the actuator 220, the actual amount of movement of the lens 210 may be different according to a camera posture due to the influence of gravity. For instance, when a user shoots a close object from below, the lens 210 needs to move against gravity as compared to a case of shooting a close object with a camera standing vertically on the surface of the earth, and therefore, more current is required to make the lens 210 in focus. Contrarily, when a user shoots an object below from above, for example, from the rooftop of a building, the lens 210 moves in the same direction as gravity, and therefore, less current is enough to make the lens 210 in focus. Consequently, when the camera posture is not considered, a moving range (i.e., the range of a current control code) for the focusing of the lens 210 increases since a margin for the posture needs to be included.

In addition, when the lens 210 is made of plastic, it contracts and expands greatly according to ambient temperature. For instance, at low temperature (e.g., −20° C.), the lens 210 contracts, resulting in an increase of a refractive index, and therefore, a focal length is shortened as compared to one at room temperature. When the focal length decreases, a distance from an image sensor plane to the lens 210 in focus also decreases, and therefore, the lens 210 is allowed to focus a distant object with less current. Contrarily, at 60° C. the lens 210 expands, resulting in an increase of the focal length. Accordingly, when taking a close-up picture, more current than that required at room temperature needs to be supplied to make the lens 210 in focus. Consequently, when the temperature is not considered, the moving range (i.e., the range of the current control code) for the focusing of the lens 210 increases since a margin for the temperature needs to be included.

However, according to the embodiments of the disclosure, offsets corresponding to a camera posture and temperature are determined and they are used when a lens moving range is determined, so that the margin of the lens moving range is decreased, and therefore, the lens moving range is decreased. As a result, auto focusing speed is increased, that is, a focus position is sought faster.

Figure 7:
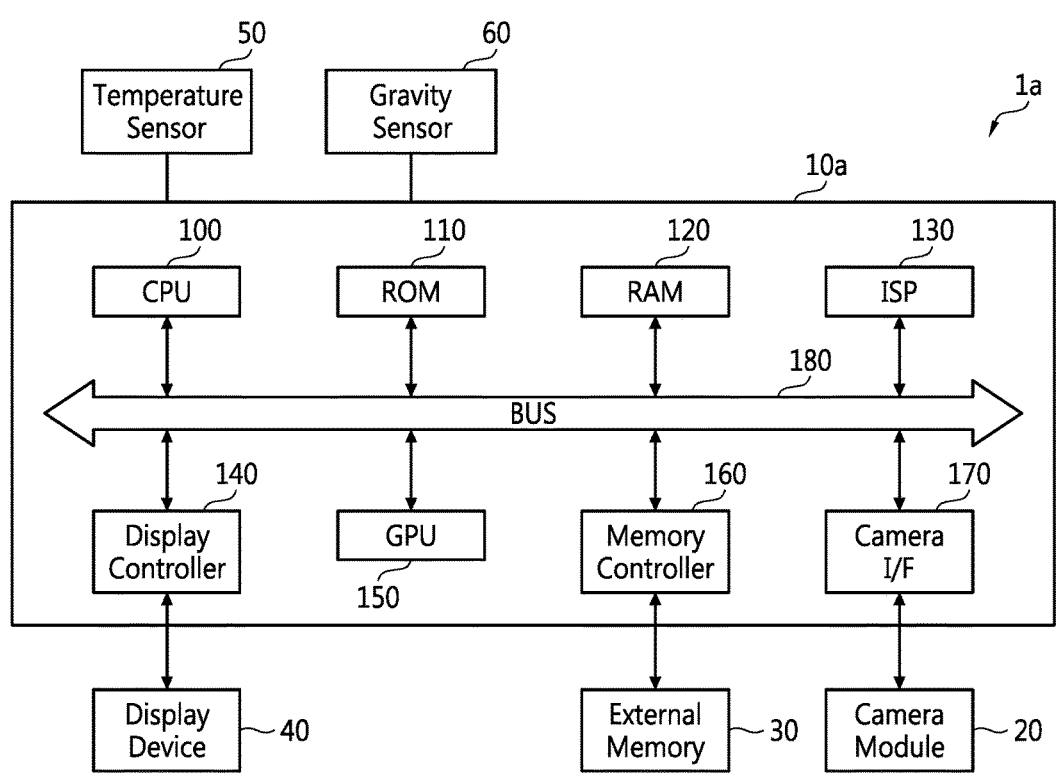
FIG. 7 is a block diagram of a camera system according to other embodiments of the disclosure.

FIG. 7 is a block diagram of a camera system 1a according to other embodiments of the disclosure. Referring to FIG. 7, the camera system 1a may be implemented as a portable electronic device. The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

The camera system 1a may include a SoC 10a, the camera module 20, the external memory 30, the display device 40, the temperature sensor 50, and the gravity sensor 60. The camera module 20, the external memory 30, the display device 40, the temperature sensor 50, and the gravity sensor 60 have been described with reference to FIG. 1 above. Thus, only differences between the camera systems 1 and 1a will be described to avoid redundancy. The camera system 1a may display a still image signal (or a still image) or a moving image signal (or a moving image), which has been picked up in the camera module 20, on the display device 40.

The external memory 30 stores program instructions executed in the SoC 10a. The external memory 30 may also store image data used to display still images or a moving image on the display device 40. The moving image is a sequence of different still images presented in a short period of time.

The external memory 30 may be formed of volatile or non-volatile memory. The volatile memory may be dynamic random access memory (DRAM), static RAM (SRAM), thyristor RAM (T-RAM), zero capacitor RAM (Z-RAM), or twin transistor RAM (TTRAM). The non-volatile memory may be electrically erasable programmable read-only memory (EEPROM), flash memory, magnetic RAM (MRAM), phase-change RAM (PRAM), or resistive memory.

The SoC 10a controls the camera module 20, the external memory 30, the display device 40, the temperature sensor 50, and the gravity sensor 60. The SoC 10a may be called an integrated circuit (IC), a processor, an application processor, a multimedia processor, or an integrated multimedia processor. The SoC 10a may include a central processing circuit (CPU) 100, a read-only memory (ROM) 110, a random access memory (RAM) 120, an image signal processor (ISP) 130, a display controller 140, a graphics processing unit (GPU) 150, a memory controller 160, the camera I/F 170, and a system bus 180. The SoC 10a may also include other elements apart from those elements illustrated in FIG. 7. The autofocus controller 300 described above with reference to FIG. 1 may be implemented in at least one element (e.g., the CPU 100 and the ISP 130) of the SoC 10a illustrated in FIG. 7 in a distributed fashion.

The CPU 100, which may be referred to as a processor, may process or execute programs and/or data stored in the external memory 30. For instance, the CPU 100 may process or execute the programs and/or the data in response to an operating clock signal output from a clock signal module (not shown). The CPU 100 may be implemented as a multi-core processor. The multi-core processor is a single computing component with two or more independent actual processors (referred to as cores). Each of the processors reads and executes program instructions.

The CPU 100 runs an operating system (OS). The OS may manage resources (such as memory and display) of the camera system 1a. The OS may distribute the resources to applications executed in the camera system 1a.

Programs and/or data stored in the ROM 110, the RAM 120, and/or the external memory 30 may be loaded to a memory (not shown) in the CPU 100 when necessary. The ROM 110 may store permanent programs and/or data. The ROM 110 may be implemented as erasable programmable ROM (EPROM) or EEPROM.

The RAM 120 may temporarily store programs, data, or instructions. The programs and/or data stored in the memory 110 or 30 may be temporarily stored in the RAM 120 according to the control of the CPU 100 or a booting code stored in the ROM 110. The RAM 120 may be implemented as DRAM or SRAM.

The ISP 130 may perform various kinds of image signal processing. The ISP 130 may process image data received from the image sensor 230 (in FIG. 1). For instance, the ISP 130 may analyze the image data received from the image sensor 230 and determine the focus state. The ISP 130 may also perform shake correction, white balance, color correction in terms of brightness or contrast, color harmony, quantization, and color conversion into a different color space on the image data received from the image sensor 230. The ISP 130 may periodically store the processed image data in the external memory 30 via the system bus 180.

The GPU 150 may read and execute program instructions involved in graphics processing. The GPU 150 may process graphic figures at a high speed. The GPU 150 may also convert data read by the memory controller 160 from the external memory 30 into a signal suitable to the display device 40. Besides the GPU 150, a graphics engine (not shown) or a graphics accelerator (not shown) may also be used for graphics processing.

The camera I/F 170 interfaces with the camera module 20. For instance, the camera I/F 170 may output a control signal for controlling the camera module 20 and may receive image data from the camera module 20 according to a predetermined interface standard or protocol. The camera I/F 170 may store the image data received from the camera module 20 in the external memory 30 or may transmit the image data to another element, e.g., the ISP 130.

The memory controller 160 interfaces with the external memory 30. The memory controller 160 controls the overall operation of the external memory 30 and controls data exchange between a host and the external memory 30. For instance, the memory controller 160 may write data to or read data from the external memory 30 at the request of the host. Here, the host may be a master device such as the CPU 100, the GPU 150, the display controller 140, or the camera I/F 170. The memory controller 160 may read image data from the external memory 30 and provide the image data for the display controller 140 in response to an image data request of the display controller 140.

The display controller 140 controls the operations of the display device 40. The display controller 140 receives image data to be displayed on the display device 40 via the system bus 180, converts the image data into a signal (e.g., a signal complying with an interface standard) for the display device 40, and transmits the signal to the display device 40.

The elements 100, 110, 120, 130, 140, 150, 160, and 170 may communicate with one another via the system bus 180. In other words, the system bus 180 connects to each of the elements 100, 110, 120, 130, 150, 160, 170, and 140 of the SoC 10a, functioning as a passage for data transmission between elements. The system bus 180 may also function as a passage for transmission of a control signal between elements.

The system bus 180 may include a data bus (not shown) for transmitting data, an address bus (not shown) for transmitting an address signal, and a control bus (not shown) for transmitting a control signal. The system bus 180 may include a small-scale bus, i.e., an interconnector for data communication between predetermined elements.

Figure 8:
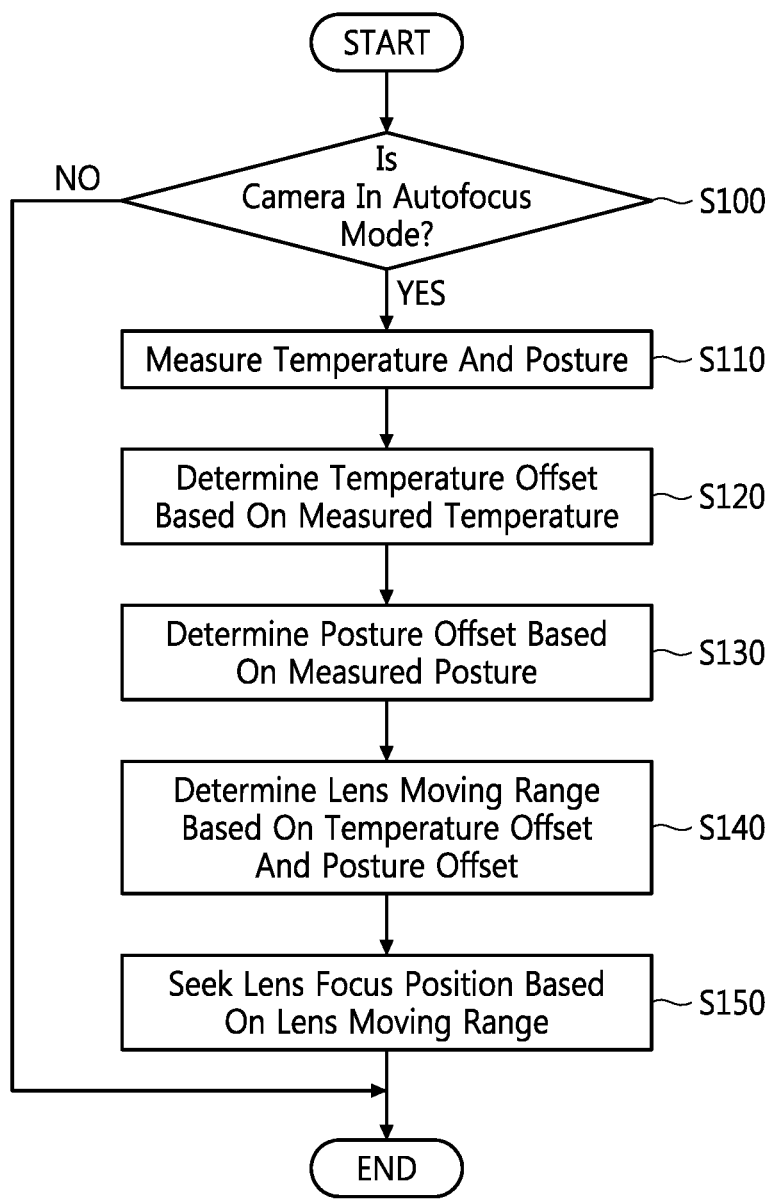
FIG. 8 is a flowchart of an autofocus method of a camera according to some embodiments of the disclosure.
Figure 9:
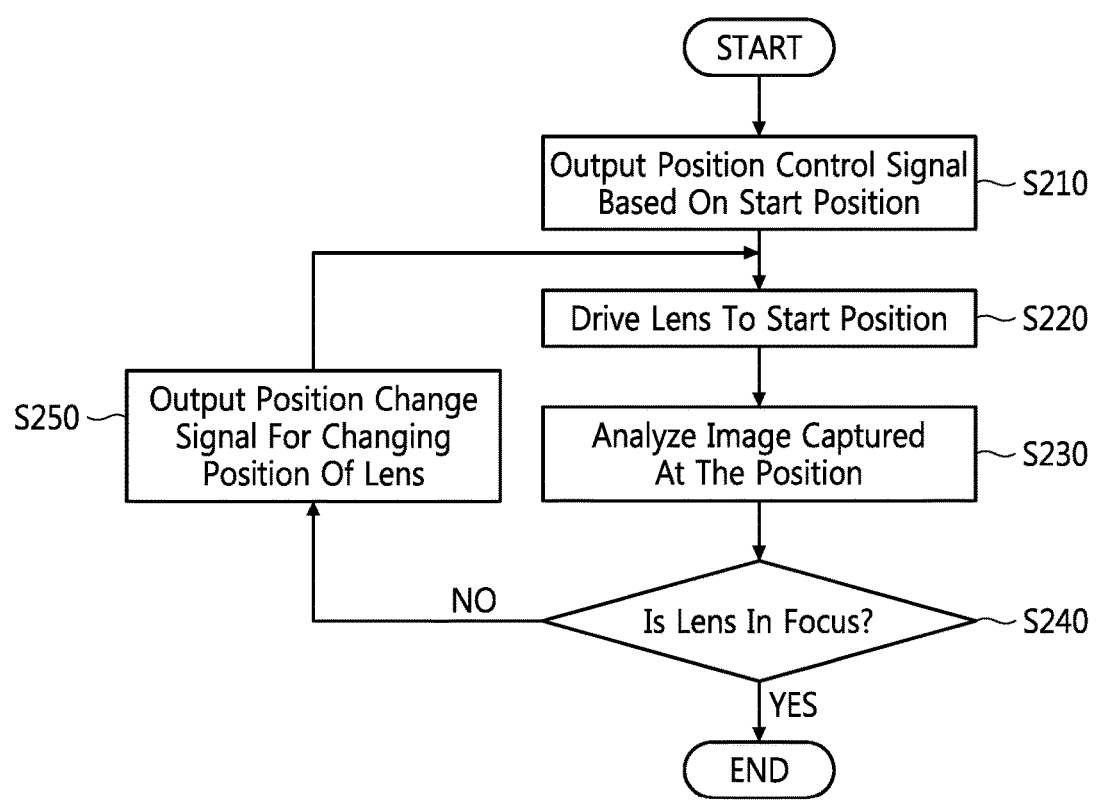
FIG. 9 is a flowchart of an operation of seeking a lens focus position in the method illustrated in FIG. 8 according to some embodiments of the disclosure.

FIG. 8 is a flowchart of an autofocus method of a camera according to some embodiments of the disclosure. FIG. 9 is a flowchart of an operation of seeking a lens focus position in the method illustrated in FIG. 8 according to some embodiments of the disclosure. The autofocus method illustrated in FIGS. 8 and 9 may be performed by the camera system 1 or 1a illustrated in FIG. 1 or 7.

Referring to FIGS. 1 through 9, the processor 10 or the SoC 10a determines whether a camera is in autofocus mode in operation S100. When it is determined that the camera is in the autofocus mode, the processor 10 or the SoC 10a receives the temperature and posture of the camera measured by the temperature sensor 50 and the gravity sensor 60 in operation S110. The temperature sensor 50 and the gravity sensor 60 are placed outside the camera module 20 in the embodiments illustrated in FIGS. 1 and 7, but they may be placed inside the camera module 20 in other embodiments.

The processor 10 or the SoC 10a determines a first offset (i.e., a temperature offset) according to the measured temperature in operation S120 and determines a second offset according to the measure posture in operation S130. Thereafter, the processor 10 or the SoC 10a determines a moving range of the lens 210 based on the first and second offsets in operation S140. An initial lens moving range may be set in advance in the register 325. The initial lens moving range may include an initial start value and an initial end value. The lens moving range may be determined by adding the first and second offsets to the initial lens moving range in operation S140. For instance, the start position of the lens 210 may be determined by adding the first and second offsets to the initial start value and the end position of the lens 210 may be determined by adding the first and second offsets to the initial end value in operation S140.

Thereafter, the focus position of the lens 210 is sought based on the moving range in operation S150. Referring to FIG. 9, a position control signal is output to the camera module 20 based on the determined start position, i.e., the start value of the lens moving range in operation S210. The camera module 20 drives the lens 210 to the start position in response to the position control signal, captures an image using the lens 210 at the start position, and transmits the captured image to the processor 10 or the SoC 10a in operation S220. The processor 10 or the SoC 10a receives and analyzes the image in operation S230 and determines whether or not the lens 210 is in focus based on the analysis result in operation S240. When it is determined that the lens 210 is not in focus, the processor 10 or the SoC 10a outputs a position change signal for changing the position of the lens 210 to the camera module 20 in operation S250. The position change signal may be a position control signal corresponding to a value one step higher than the start value of the lens moving range.

The camera module 20 changes the position of the lens 210 in response to the position change signal, captures an image using the lens 210 at the changed position, and transmits the captured image to the processor 10 or the SoC 10a in operation S220. The processor 10 or the SoC 10a receives and analyzes the image in operation S230 and determines whether the lens 210 is in focus based on the analysis result in operation S240. Such procedure is repeated until the lens 210 is in focus.

Figure 10:
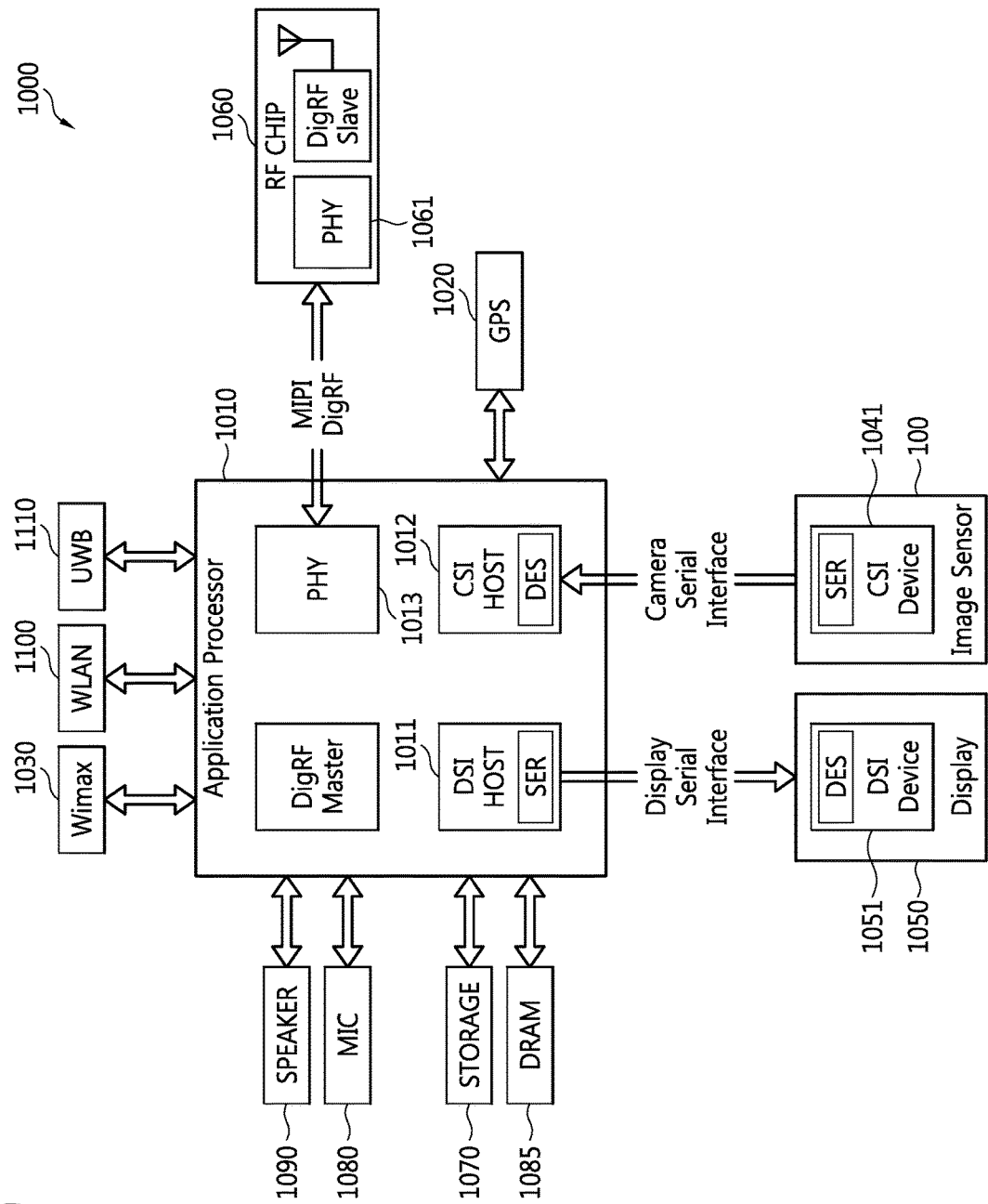
FIG. 10 is a block diagram of an electronic system according to an embodiment of the disclosure.

FIG. 10 is a block diagram of an electronic system 1000 according to an embodiment of the disclosure.

Referring to FIG. 10, the electronic system 1000 may be a data processing apparatus capable of using or supporting an MIPI interface, e.g., a mobile phone, a personal digital assistant (PDA), a portable multimedia player (PMP), an internet protocol television (IPTV), or a smart phone.

The electronic system 1000 includes an application processor 1010, the image sensor 100, and a display unit 1050.

A camera serial interface (CSI) host 1012 included in the application processor 1010 may establish serial communication with a CSI device 1041 of the image sensor 100 through a CSI. For example, an optical deserializer may be included in the CSI host 1012, and an optical serializer may be included in the CSI device 1041.

A display serial interface (DSI) host 1011 included in the application processor 1010 may establish serial communication with a DSI device 1051 of the display 1050 through a DSI. For example, an optical serializer may be included in the DSI host 1011 and an optical deserializer may be included in the DSI device 1051.

The electronic system 1000 may further include a radio-frequency (RF) chip 1060 for communicating with the application processor 1010. A physical layer PHY 1013 of the electronic system 1000 and a physical layer PHY 1061 of the RF chip 1060 may exchange data with each other according to the MIPI DigRF standard.

The electronic system 1000 may further include a global positioning system (GPS) 1020, a storage unit 1070, a microphone 1080, a dynamic random access memory (DRAM) 1085, and a speaker 1090. The electronic system 1000 may establish communication using world-wide interoperability for microwave (Wimax) 1030, a wireless local area network (WLAN) 1100, an ultra-wide band (UWB) 1110, etc.

The present general disclosure can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general disclosure can be easily constructed by programmers.

As described above, according to some embodiments of the disclosure, in an auto-focusing operation of a low-middle priced camera including a camera module, which includes a plastic lens sensitive to temperature and a VCM actuator adjusting the position of the lens in open-loop mode, offsets are determined according to the posture and temperature of the camera and these offsets are taken into account when a lens moving range is determined, so that the lens moving range is reduced. As a result, the performance and speed of the auto-focusing operation increase.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to exemplary embodiments thereof, it will be understood by those of ordinary skill in the art that various changes in forms and details may be made therein without departing from the spirit and scope of the disclosure as defined by the following claims.

What is claimed is:

1. A camera controller for controlling a camera module which includes a plastic lens and an actuator that controls a position of the lens in an open-loop mode, the camera controller comprising:
an offset determiner configured to determine a first offset corresponding to a measured temperature of a camera and a second offset corresponding to a measured posture of the camera;
a lens moving range determiner configured to determine a lens moving range of the lens in the open-loop mode based on the first offset and the second offset; and
an autofocus calculator configured to output a position control signal for controlling a position of the lens while seeking a focus position of the lens based on the lens moving range.

2. The camera controller of claim 1, further comprising: a register configured to store an initial lens moving range.

3. The camera controller of claim 2, wherein:
the initial lens moving range comprises an initial start value and an initial end value; and
the lens moving range determiner determines a start position of the lens by adding the first offset and the second offset to the initial start value and determines an end position of the lens by adding the first offset and the second offset to the initial end value.

4. The camera controller of claim 3, wherein the autofocus calculator outputs the position control signal to the camera module based on the start position, generates a result of an analysis by receiving and analyzing an image which has been captured using the lens driven to the start position by the actuator in response to the position control signal, and determines a result of determining whether the lens is in focus based on the result of the analysis.

5. The camera controller of claim 4, wherein the autofocus calculator outputs the position control signal to the camera module to change the position of the lens according to the result of determining whether the lens is in focus.

6. The camera controller of claim 4, wherein the autofocus calculator calculates a contrast value of the captured image and determines whether the lens is in focus based on a peak value of the contrast value.

7. The camera controller of claim 4, wherein the offset determiner comprises:
a first lookup table configured to store temperature offsets respectively corresponding to a plurality of temperatures and to select and output at least one temperature offset approximating to the measured temperature; and
a second lookup table configured to store posture offsets respectively corresponding to a plurality of postures and to select and output at least one posture offset approximating to the measured posture.

8. The camera controller of claim 7, wherein:
the selected at least one temperature offset comprises at least two temperature offsets,
the selected at least one posture offset comprises at least two posture offsets, and
the offset determiner comprises:
a first interpolator configured to calculate the first offset by performing interpolation on the at least two temperature offsets that have been selected; and
a second interpolator configured to calculate the second offset by performing interpolation on the at least two posture offsets that have been selected.

9. The camera controller of claim 7, wherein the measured posture comprises:
first angle information indicating an angle of the camera module to a first axis perpendicular to the surface of the earth; and
second angle information indicating an angle of the camera module to a second axis perpendicular to the first axis.

10. The camera controller of claim 7, wherein the temperature offsets and the posture offsets are predetermined by testing or simulating the camera module or a representative of the camera module.

11. A camera system comprising:
a camera module comprising a plastic lens and an actuator that controls a position of the lens in an open-loop mode;
a temperature sensor configured to measure a temperature of the camera module;
a gravity sensor configured to measure a posture of the camera module; and
a camera controller configured to control the camera module based on the measured temperature and the measured posture, wherein
the camera controller determines a first offset corresponding to the measured temperature and a second offset corresponding to the measured posture, determines a lens moving range of the lens in the open-loop mode based on the first offset and the second offset, and seeks a focus position of the lens based on the lens moving range.

12. The camera system of claim 11, wherein the camera controller determines the lens moving range by adding the first offset and the second offset to a predetermined initial lens moving range and outputs a position control signal for controlling the actuator to the camera module based on the lens moving range.

13. The camera system of claim 12, wherein:
the camera module adjusts the position of the lens to be an adjusted lens based on the position control signal, captures an image using the adjusted lens, and outputs the image to the camera controller; and
the camera controller generates a result of an analysis by receiving and analyzing the image from the camera module and determines whether the lens is in focus based on the result of the analysis.

14. The camera system of claim 13, wherein the camera controller calculates a contrast value of the image and determines whether the lens is in focus based on a peak value of the contrast value.

15. The camera system of claim 13, wherein the camera controller does not receive information about the position of the lens from the camera module, outputs the position control signal to the camera module to sequentially change the position of the lens within the lens moving range until the lens is in focus, and receives and analyzes an image captured using the lens whose position is changed in response to the position control signal from the camera module.

16. A camera system, comprising:
a camera module comprising a plastic lens and an actuator that moves the lens along an axis within the camera module in a range in an open-loop mode;
a sensor that measures temperature or a posture of the camera module; and
an electronic circuit that:
generates an actuator command for moving the lens along the axis,
increases or decreases an amplitude of the actuator command in accordance with an offset amplitude corresponding to the measured temperature or posture, so as to generate a modified actuator command, and
communicates the modified actuator command to the actuator so as to move the lens along the axis in the range in the open-loop mode.

17. The camera system of claim 16, wherein:
the sensor measures the temperature and another sensor measures the posture,
the offset amplitude corresponds to the measured temperature, and
the electronic circuit increases or decreases the amplitude of the actuator command in accordance with both the offset amplitude and another offset amplitude corresponding to the measured posture, so as to generate the modified actuator command.

18. The camera system of claim 16, wherein the posture identifies an orientation of the camera module with respect to the direction of gravitational force.

19. The camera system of claim 16, wherein the modified actuator command is an electrical current.

20. The camera system of claim 16, wherein the electronic circuit interpolates the offset amplitude from a first offset amplitude corresponding to a first temperature that is lower than the measured temperature and a second offset amplitude corresponding to a second temperature that is higher than the measured temperature.

* * * * *